United States Patent Office 2,719,675
Patented Oct. 4, 1955

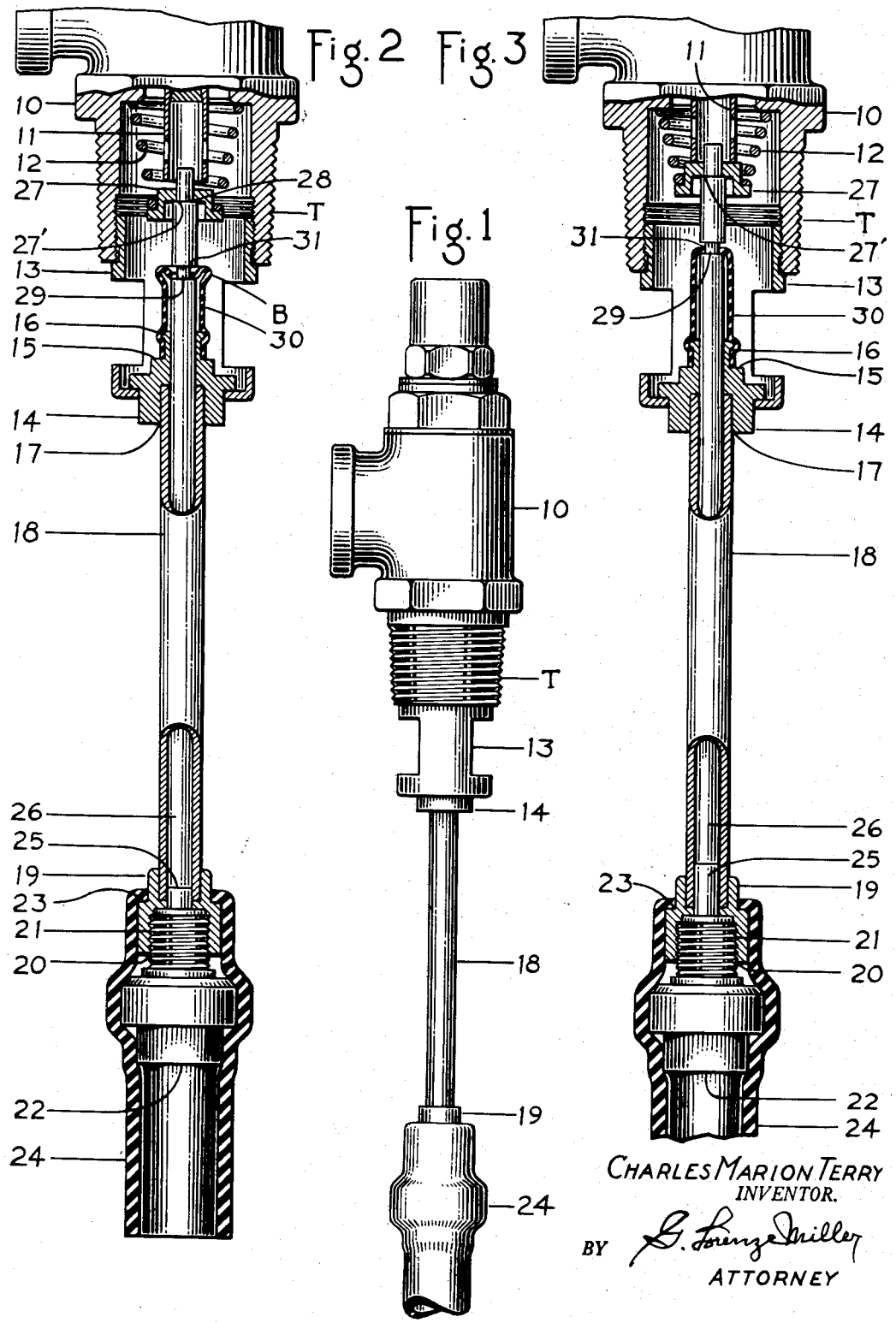

2,719,675

DIP TUBE TYPE AUTOMATIC RESEATING PRESSURE AND TEMPERATURE RELIEF VALVE

Charles Marion Terry, Decatur, Ill., assignor to A. W. Cash Valve Manufacturing Corporation, Decatur, Ill.

Application October 21, 1953, Serial No. 387,435

3 Claims. (Cl. 236—92)

The present invention relates to a dip tube type automatic reseating pressure and temperature relief valve, and constitutes an improvement of the invention covered in the prior pending application entitled Automatic Pressure and Temperature Relief Valve, now bearing Serial No. 376,075, and filing date of August 24, 1953, and has for its main object to enable the complete on-off cycle so essential to the correct operation of a valve of this type, and which is effected by the "dip tube" or stem having mounted on its lower end a Vernatherm thermostat whose function in the present invention is to enable the complete on-off non-weeping performance thereof by means of its rubber jacket so arranged and of such material as to accomplish such on-off non-weeping function.

Said rubber jacket is of a type suitable for the purpose intended in that it possesses a substantially low thermal coefficient of heat transfer, is inert to hot water, and, when immersed in hot water, will during its operating life, be impervious to deterioration and deformity.

The purpose and function of this rubber jacket is to effect through its low coefficient of heat transfer and by means of its particular structure and arrangement upon the Vernatherm thermostat, the introduction of a time lag in the on-off cycle of the temperature mechanism of this improved valve, which will be herein later more fully explained.

Other objects and advantages of the invention will become apparent in the course of the following detailed description taken in connection with the accompanying drawings, wherein—

Figure 1 is an actual size elevational view of the improved valve, the lower end cut off to conserve space.

Figure 2 is an enlarged axial sectional view showing the co-operating elements in inactive position, the upper portion of the valve not shown, it being that of the hereinbefore mentioned prior application.

Figure 3 is a view similar to Figure 2, shown certain elements of the valve and particularly the stem and the rubber jacketed Vernatherm thermostat in operative position resulting from abnormal heat of the water in the tank with which the valve is adapted to be connected.

It is here noted that known types of automatic reseating temperature and pressure relief valves have an unfavorable operating characteristic known as "weeping" due to the fact that the thermostat on a stem type valve is located down in the hottest water of the tank on which the device is installed, the hottest water being, of course, in the upper part of the tank. In such known types of valves the thermostat immersed in the hot water opens when the water reaches its operating temperature, but, as the thermostat is already in the hottest water in the tank, there is not available any additional temperature to enable it to open farther, and consequently it opens only a crack, and because of its sensitivity it will regulate the temperature by relieving only sufficient water to retain the maximum temperature in its lower operating range. It is obvious that a valve operating under this condition does not shut off completely, but continues to discharge a small amount of water, and from such a condition comes the term "weeping," well known to the industry and trade. Such "weeping" valves are occasionally tampered with by persons unfamiliar with the mechanism and the cause of the trouble, with the result that in their endeavor to correct the "weeping" and subsequent poor performance of the valve, the mechanism is damaged, often rendering the valve action inaccurate and at times useless, and unsafe for use.

And further, the difference between the operating characteristics of the dip tube type and the non-dip tube type valves is here pointed out to set forth the distinctive advantages embodied in the improved valve of this invention.

For example, the non-dip tube or non-stem type valve of the hereinbefore mentioned prior application operates with a snap action because the temperature at the Vernatherm thermostat is lower than that of the water in the top of the tank. Thus, when such a valve starts to open in operation, the hot water then being brought to the Vernatherm thermostat forces the valve wide open, causing an instant surge of hot water to be released, sufficient to drop the total temperature in the top of the hot water tank to a few degrees lower than the operating temperature of the Vernatherm thermostat, with the result that when the surge of cooler water replaces the released surge of hot water and reaches the Vernatherm thermostat, the valve closes completely.

The improved valve of the present invention, however, embodies a mechanism that eliminates "weeping" and enables the essential on-off cycle advantages of the non-dip tube type valve to be embodied as well in the dip tube type, in that the Vernatherm thermostat of the improved valve of this invention is encased in a pliant rubber jacket of low coefficient of heat transfer. This jacket covers said Vernatherm thermostat, extending therearound and around the holder which engages the Vernatherm thermostat and depending downwardly to approximately one inch below the bottom of the Vernatherm thermostat, thereby producing an inverted pocket approximating the diameter and length of the Vernatherm thermostat for the purpose of holding a pocket of fluid in contact with the Vernatherm thermostat while it is operating. In such operation the Vernatherm thermostat, of course, causes the discharge of hot water from the top part of the tank and around the Vernatherm thermostat, and the replacing of said hot water with cooler water. Now, inasmuch as said inverted pocket of the rubber jacket continues to retain substantially its capacity of hot fluid in contact with the Vernatherm thermostat it continues to relieve until the incoming cooler water surrounding the Vernatherm thermostat effects the cooling of the fluid within the pocket of the rubber jacket sufficiently to reduce the temperature therein, thereby returning the Vernatherm thermostat to inactive position and closing the relieving mechanism of the valve.

By this improved means a practical, dependable, and positive on-off action is accomplished, which at the same time imparts a strong and important safety factor to this improved valve. It will appear obvious to those skilled in the art that the positive, complete on-off action effected by this improved device does insure uninterrupted performance thereof, thus requiring no attention and necessitating no adjustment or repair, and removing any possibility of tampering by unskilled persons.

Referring now in detail to the drawings, 10 designates the cylindrical valve body, 11 the tubular stem, 12 the return coil spring, and 13 the Vernatherm thermostat cage of the hereinbefore mentioned prior application, the several co-operating elements in the valve of which are unchanged in this improved valve.

The cage 13 supports the stem adapter 14 having a shoulder 15 from which extends upwardly a beaded neck portion 16. A socket 17 in the stem adapter 14 supports the push rod tube 18 which supports at its lower end the Vernatherm thermostat holder 19 whose internally threaded opening 20 engages the externally threaded portion 21 of the Vernatherm thermostat 22.

A fitted pliant rubber jacket 24 encases the Vernatherm thermostat 22 as shown particularly in Fig. 2, the uppermost part of said jacket 24 fitting snugly on and around the shoulder 23 of the holder 19, while the lower portion of the jacket depends downwardly approximately one inch below the bottom of the Vernatherm thermostat, thereby producing a pocket for hot fluid as before explained.

The Vernatherm thermostat is provided with a lift-stem 25 in co-axial relation to the push rod 26 slidably engaged in the push rod tube 18 and extending upwardly therefrom centrally through the stem adapter 14 into engagement with the central aperture 27' to support the spring seating cap 27 disposed upon a shoulder 28 formed by the reduced diameter of the upper end of the rod 26.

A relatively short distance from the upper end of the rod 26 is a circumferentially disposed groove 29. A pliant rubber sleeve 30 is provided adjacent the upper end of the push rod 26 as shown in Figs. 2 and 3, said sleeve having a relatively small aperture 31 in its upper end so that it fits snugly around the groove 29 thus securing the position of the upper end of said sleeve in the groove 29, while the lower end of this sleeve fits tightly around the beaded neck portion 16 of the stem adapter 14 for the purpose of sealing off any admission of water into the tube 18 and subsequently into the Vernatherm thermostat 22. It will be noted that when this device is activated from its inactive position as shown in Fig. 2 to its active position as shown in Fig. 3 the pliant rubber sleeve 30 stretches out, taking up the slack indicated by the bulge at B in Fig. 2.

In use the improved structure above described is operatively connected to a hot water storage tank, for example, by means of the externally threaded portion T.

With the improved valve thus assembled it is apparent that the Vernatherm thermostat 22 is positioned at a substantial depth in the hot water in the top of the tank, so that it is instantly responsive to the water temperature.

It is obvious, too, that due to the peculiar form and application of the rubber jacket 24 as shown especially in Fig. 2, the Vernatherm thermostat 22 is not only fully insulated against undue rapid cooling on ingress of cooler water into the tank, but is still further enabled to retain near-normal temperature during the relief action of the valve, nevertheless insuring a gradual lowering of the temperature of the Vernatherm thermostat in order that the correct amount of hot water may be relieved by the valve, while at the same time insuring the positive shut-off of the relief action of said valve as well as the elimination of the above mentioned "weeping" disadvantage.

Inasmuch as the ingredients of the rubber sleeve 30 and the rubber jacket 24 impart thereto substantially permanent heat and deterioration resistant characteristics, these two rubber elements are thus distinguished from ordinary rubber used in tubing and the like, and thereby insure the continuous and uninterrupted functioning of this improved valve, far beyond the capability of known valves for pressure and temperature relief.

While I have set out the construction of my invention in detail in connection with the preferred embodiment it is to be understood that the invention is not to be limited thereby but is as defined in the appended claims and to be considered comprehensive of all forms of structure coming within their scope.

What I claim and desire to secure by U. S. Letters Patent is—

1. A dip tube type automatic reseating pressure and temperature relief valve comprising a valve body having a cylindrical opening in the bottom thereof, a valve seat centrally located within said opening, a stem adapter positioned below the opening in the valve body and the valve seat, said stem adapter having an opening therethrough and a beaded neck portion at one end, a push rod tube connected to the other end of the stem adapter, said push rod tube being aligned with the opening through the stem adapter, the other end of the push rod tube being enclosed by a holder for a thermostat, said thermostat being screw threaded in the bottom of said thermostat holder, said thermostat having a lift stem extending into the bore of the push rod tube, a push rod extending into said push rod tube and being in contact with the stem of the thermostat, the upper end of the push rod extending through and above the stem adapter, the upper end of the push rod within the valve body supporting a valve, a rubber sleeve encircling the push rod and its other end encircling the upper end of the stem adapter, and a cylindrical rubber jacket encircling the upper end of the thermostat holder and projecting downwardly over and around the thermostat and below the same, thereby insulating the greater portion of the thermostat.

2. The structure according to claim 1, wherein the push rod below the valve thereon has a circumferentially disposed groove to receive one end of the rubber sleeve.

3. The structure according to claim 1, wherein the cylindrical rubber jacket extending below the thermostat is of a length to form a pocket for fluid.

References Cited in the file of this patent
UNITED STATES PATENTS

| | | |
|---|---|---|
| 1,927,036 | Johnson | Sept. 19, 1933 |
| 2,275,928 | Topham | Mar. 10, 1942 |
| 2,297,016 | Osterheld | Sept. 29, 1942 |
| 2,548,878 | Dillman | Apr. 17, 1951 |